April 8, 1958      W. F. WILCOX      2,829,539
AUXILIARY ACCELERATOR PEDAL FOR VEHICLES
Filed May 20, 1955
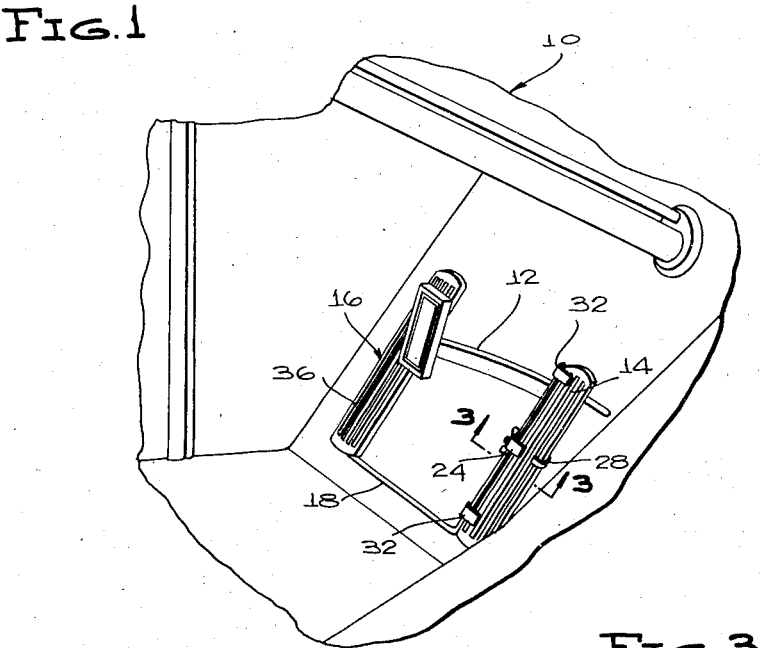
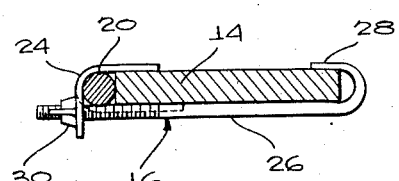
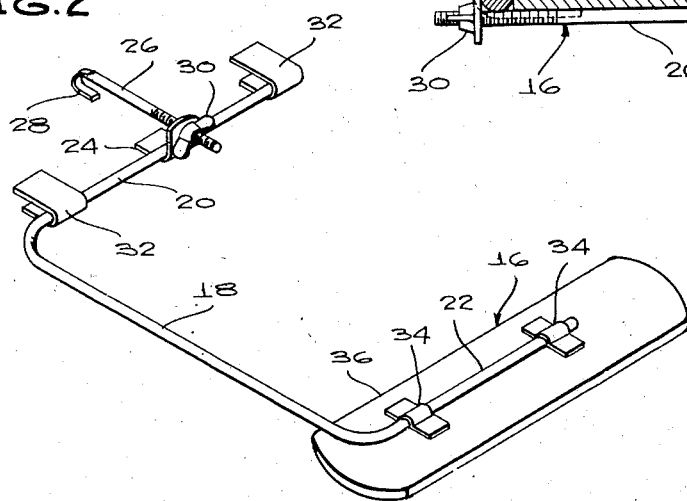
INVENTOR.
WILVEN F. WILCOX
BY
McMorrow, Berman + Davidson
ATTORNEYS

United States Patent Office 2,829,539
Patented Apr. 8, 1958

2,829,539

AUXILIARY ACCELERATOR PEDAL FOR VEHICLES

Wilven F. Wilcox, Detroit, Mich.

Application May 20, 1955, Serial No. 509,835

1 Claim. (Cl. 74—562.5)

This invention relates to an auxiliary accelerator pedal, adapted to be attached to the conventional accelerator pedal of a vehicle, so as to permit one to use either the left or right foot for the purpose of feeding the fuel to the engine.

In automobiles having automatic drives, and devoid of clutch pedals, there is disposed, in side by side relation, only a brake pedal and an accelerator pedal. Both of these pedals together occupy a relatively small amount of space, there being a substantial clear space to the left of the brake pedal.

The present invention is intended to apply mainly to vehicles of this type and is intended to provide rest for one's right foot, particularly during the making of a long trip.

The accelerator pedal is usually depressed with the right foot, and over a long period of time, fatigue may develop. The foot must be maintained in an unvarying position, throughout the drive, and this of course is the main cause of foot fatigue.

The main object of the present invention is to provide an auxiliary foot pedal, which is adapted to be disposed in the space mentioned. In accordance with the invention, the auxiliary and main accelerator pedals are linked together for conjoint movement, so that if desired, one can use the left pedal for the purpose of feeding the gas to the engine, with depression of the left pedal by one's left foot being effective to cause a slave movement on the part of the main pedal, through which the actual control upon the feeding of the fuel is exerted through the medium of a suitable linkage extending from the main pedal to the carburetor.

A further object of importance is to provide a device as stated which can be secured to or detached from a conventional main accelerator pedal of an automotive vehicle with a minimum amount of difficulty and loss of time.

Still another object is to provide a device as stated which will be so designed as to be capable of manufacture at low cost, will be of attractive appearnce when mounted within a vehicle, will be rugged and trouble-free in operation, and will be so designed as to be usable on the accelerator pedals of any of various makes of vehicles.

Other objects will appear from the following description, the claims appended thereto, and from the annexed drawing, in which like reference characters designate like parts throughout the several views, and wherein:

Figure 1 is a perspective view showing, fragmentarily, the interior of an automotive vehicle, and illustrating the auxiliary pedal constituting the present invention in association with a conventional gas pedal and brake pedal;

Figure 2 is an inverted perspective view of the auxiliary pedal assembly per se; and Figure 3 is an enlarged transverse sectional view on line 3—3 of Figure 1.

The reference numeral 10 generally designates a conventional automotive vehicle having a brake pedal 12 and a main accelerator pedal 14 spaced closely from the brake pedal, to the right thereof.

The accelerator pedal 14 is, of course, controlled by the right foot, and on long drives, the necessity of maintaining the right foot upon the pedal constantly proves to be quite fatiguing so far as the vehicle operator is concerned.

Accordingly, there is provided the present auxiliary pedal assembly generally designated 16, which includes an elongated, U-shaped bar 18 having a straight, elongated bight integral at its opposite ends with straight legs 20, 22 which are extended perpendicularly to the length of the bight, the leg 20 being somewhat longer than the leg 22.

To the leg 20, medially between the opposite ends thereof, there is fixedly secured an L-shaped clamping bolt support bracket 24, receiving the leg 20 at the juncture between the angularly related portions of the bracket. The bracket has, in one of said portions thereof, a smooth-walled opening, receiving the threaded inner end of a clamping bolt 26 having a hook 28 at its outer end.

Threadedly engaged with the inner end portion of the clamping bolt is a wing nut 30 which when rotated in one direction, shifts the bolt transversely of the main pedal, to tightly engage the hook therewith.

Spaced longitudinally of the leg 20 from the bracket 24, and disposed adjacent the opposite ends of the leg 20, are clips 32, of U-shape, said clips being adapted to receive one side edge of the main accelerator pedal 14, with the leg 20 extending along the same side edge.

When the clips are placed in straddling relation to the side edge of the main accelerator pedal 14, the clamping bolt 26 extends transversely of the main pedal below the same, and the hook 28 is engaged about the other side edge of the main pedal. The nut 30 is then turned home, and tends to shift the clamping bolt 26 to the left in Figure 3, so as to fixedly secure the leg 20 to the main accelerator pedal.

The bight 18 extends coaxially with the axis of pivotal movement of the accelerator pedal, and hence rocks about its long axis whenever the main accelerator pedal is depressed or lifted.

The other leg 22 of the bar extends longitudinally and centrally of the auxiliary pedal member, said leg 22 extending through sleeve-like connecting members 34 that are welded or otherwise fixedly secured to the underside of the pedal member 36.

The pedal member 36 extends in parallelism with the main pedal 14, and is in a plane common to that of the main pedal. Accordingly, when either pedal is depressed, there results a slave movement on the part of the other pedal, thus permitting either pedal to be used. One can, thus, use the left hand or auxiliary pedal member for a period of time during a long trip, operating the same with the left foot, and thereafter, can switch to the right pedal, operating the same with the right foot, to reduce foot fatigue to a minimum.

The device, as will be noted, has the further advantage in that the clamping means illustrated and described permits the device to be connected of any of various pedals, differing from one another in respect to the length and/or width thereof. Further, the clamping means can be adjusted longitudinally of the associated main pedal, to easily and swiftly align the bight portion of the support bar coaxially with the axis of pivotal movement of the main accelerator pedal.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

An auxiliary accelerator pedal attachment for an automotive vehicle including a flat, elongated main accelerator pedal, comprising: an elongated, U-shaped bar formed with a straight, elongated bight and with a pair of straight legs integral with the bight and extending perpendicularly to the length thereof; an auxiliary pedal member extending longitudinally of and secured to one of said legs, the other leg being adapted to extend in the plane of said main pedal, in longitudinal contact with one side edge portion of the main pedal; a bracket having portions at right angles to each other, said bracket being fixedly secured to said other leg intermediate the ends of said other leg, and receiving said other leg at the juncture between the angularly related portions of the bracket, one portion of the bracket having a smooth-walled opening; a clamping bolt having one end threaded, the other end of the bolt being formed as a hook having a free end projecting toward the bracket, said hook being adapted for receiving the opposite side edge portion of the main pedal with the shank of the bolt extending transversely of and below the main pedal, said first named end of the bolt sliding in said opening and the bolt extending perpendicularly to the length of said other leg below the same, the other portion of the bracket and said free end of the hook lying in a common plane above said other leg so as to overlie the main pedal; a nut threaded on said one end of the bolt and bearing against said one portion of the bracket for shifting the bolt and bracket toward each other into positions clamping the main pedal between them; and a pair of U-shaped clips spaced longitudinally of said one leg at opposite sides of the bracket and opening toward the hook for straddling the main pedal, said clips having top portions in a plane common to that of the free end of the hook and said other portion of the bracket, and bottom portions lying in the plane of said shank of the bolt, the clips embracing and being fixedly secured to said other leg.

References Cited in the file of this patent

UNITED STATES PATENTS

| | | |
|---|---|---|
| 1,242,819 | Lawrence | Oct. 9, 1917 |
| 1,446,304 | Holtz | Feb. 20, 1923 |
| 2,088,182 | Verch | July 27, 1937 |
| 2,202,126 | Tercero | May 28, 1940 |
| 2,645,948 | Bechman | July 2, 1953 |
| 2,747,427 | Morsch | May 29, 1956 |
| 2,764,037 | Venditty | Sept. 25, 1956 |